United States Patent [19]

Hulland et al.

[11] 4,162,497

[45] Jul. 24, 1979

[54] SIDE LOBE SUPPRESSION DEVICE FOR A DIRECTIONAL RECEIVING SYSTEM

[75] Inventors: Burton L. Hulland, Glenwood Landing; Arnold P. Weinstein, Flushing, both of N.Y.

[73] Assignee: The United States of America as represented by the Secretary of the Navy, Washington, D.C.

[21] Appl. No.: 310,518

[22] Filed: Sep. 18, 1963

[51] Int. Cl.² .............................................. H04B 1/10
[52] U.S. Cl. ............................................. 343/100 LE
[58] Field of Search .................. 343/100 LE, 100 CL; 325/476

[56] References Cited
U.S. PATENT DOCUMENTS

| | | | |
|---|---|---|---|
| 3,761,923 | 9/1973 | Downie | 343/100 LE X |
| 4,021,805 | 5/1977 | Effinger et al. | 343/100 LE X |

Primary Examiner—T. H. Tubbesing
Attorney, Agent, or Firm—R. S. Sciascia; Sol Sheinbein

EXEMPLARY CLAIM

1. A side lobe suppression device for use in a directional receiver system comprising first means for receiving first RF signals and converting them to first IF signals;

second means for receiving second RF signals and converting them to second IF signals;

first delay means connected to the second receiving means for delaying the second IF signals a predetermined time;

third means operatively connected to said first means and said first delay means for time sharing said first and second IF signals;

fourth means operatively connected to said third means for demodulating said first and second time-shared IF signals; and fifth means operatively connected to said fourth means for comparing one of said first and second demodulated signals with the other, said fifth means including means for inverting the demodulated signals carrying the same information as said delayed IF signals, and a second delaying means for delaying the other demodulated signals a predetermined amount.

8 Claims, 3 Drawing Figures

SIDE LOBE SUPPRESSION DEVICE FOR A DIRECTIONAL RECEIVING SYSTEM

The present invention relates generally to directional receiving systems and more particularly to directional receivers using a plurality of antennas.

In directional receivers such as are employed in radio, television, and radar circuits and the like, the beam or lobe of desired energy as received is accompanied by secondary and undesirable lobes of energy of lesser intensity than the main lobe. These undesirable noise signals are most often either the product of energy jamming stations, due to the configuration of the transmitting antenna, or noise from other sources. Conventionally, side lobe cancellation has been accomplished using gain matching techniques in the intermediate frequency stages of dual antenna systems. Such techniques, although quite useful in many applications, inherently limit the dynamic amplitude range of operation of the system. The present invention overcomes this and other limitations of such systems.

The apparatus of the present invention provides for cancellation of the secondary or noise lobes after the received signals have been converted from IF frequencies to demodulated signals. A time-sharing arrangement is utilized whereby the main and secondary lobes are alternately delayed, and gated or switched to comparison circuitry after the conversion to usable frequencies.

An object of the present invention is the provision of side lobe cancellation circuitry in a dual antenna receiver.

A further object is the provision of a receiver with a much larger dynamic frequency range of operation than heretofore possible.

Yet another object is the provision of anti-jamming circuitry.

A still further object is the provision of an interference and noise-free directional receiving system.

Other objects, advantages and novel features of the invention will become apparent from the following detailed description of the invention when considered in conjunction with the accompanying drawings wherein:

FIG. 3 shows a typical directional RF signal.

Figure 1:
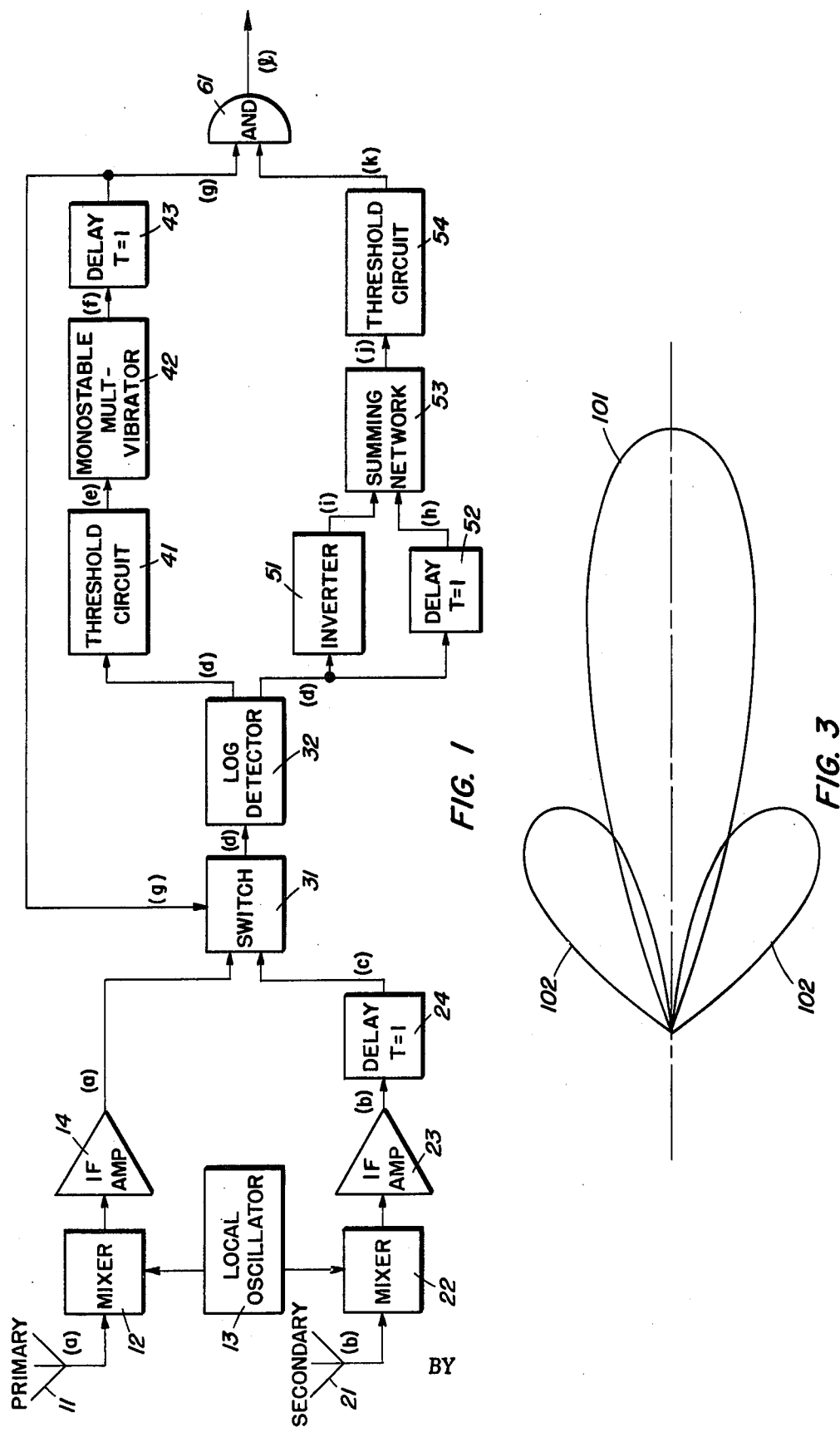
FIG. 1 shows a block diagram of one embodiment of the invention.

Referring now to FIG. 1 of the drawings, a dual antenna directional receiver is shown wherein the primary antenna 11 is connected to an IF mixer stage 12 which in turn is connected to an IF amplifier 14. A secondary antenna 21 is connected to an IF mixer 22 which is connected to IF amplifier 23 and which in turn is connected to a delay line 24. The mixers 12 and 22 are provided with a demodulating wave from the local IF oscillator 13.

The outputs from these IF channels, outputs from amplifier 14 and delay 24, are connected to the inputs of an electronic switch 31; and the output of the switching means is connected to logarithmic detector or converter 32.

One output leg of the detector 32 is connected to a gating signal generating arrangement comprising a threshold or triggering circuit 41 which in turn passes a signal to a monostable multivibrator 42 and said multivibrator is connected to a delay line or storage device 43.

Another lead from the detector 32 is connected to the parallel arrangement of inverter means 51 and storage line 52, the outputs of this parallel arrangement passing to a summing circuit, addition circuit or comparator 53. It is evident that the combination of inverter 51 and summing circuit 53 could be replaced by a subtractor. The output of the comparator 53 is connected to a threshold or triggering circuit 54 of similar configuration to the trigger 41 aforementioned.

The signals from the threshold circuit 54 are coupled to one input of an "AND" circuit 61, the gating pulses for which are supplied from delay line 43. The delay 43 is also connected to the control terminal of electronic switch 31.

Figure 2:
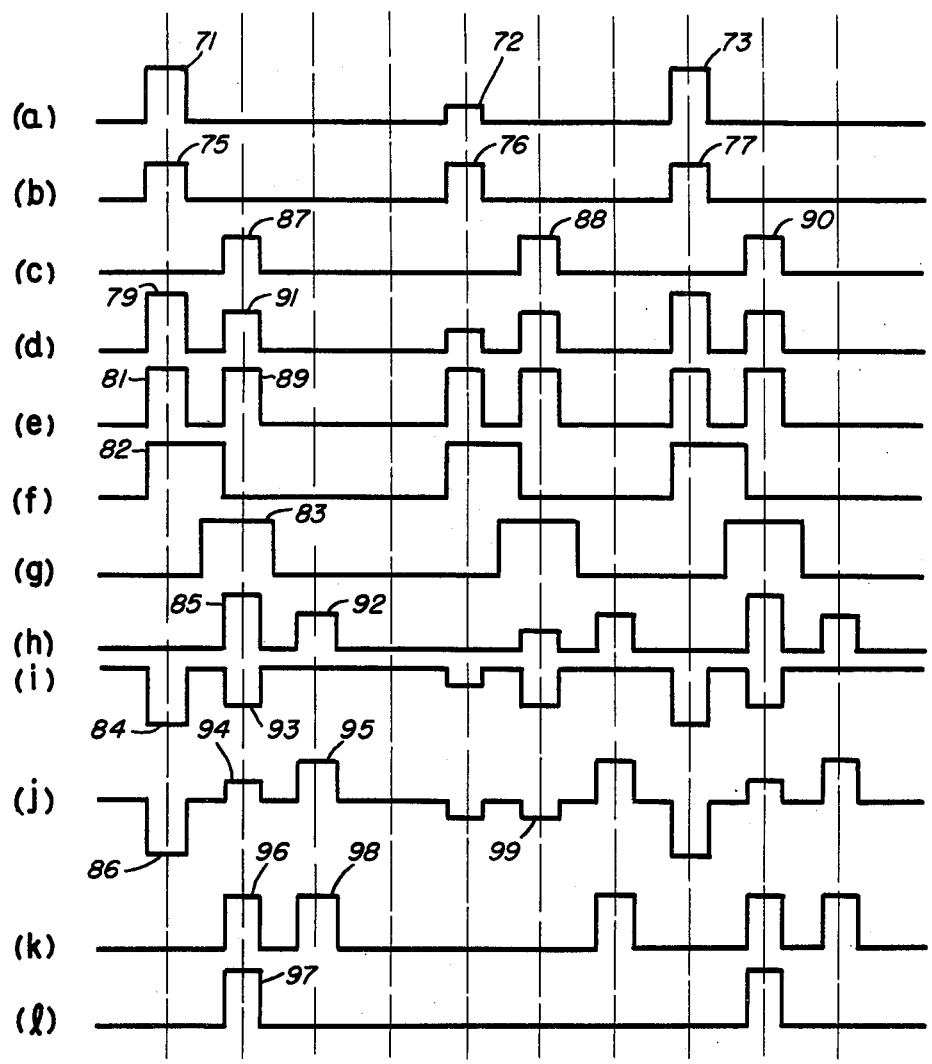
FIG. 2 is a pictorial representation of the timing sequence of signals in various portions of the device.

Referring now to FIG. 2 in conjunction with FIG. 3 which represents a typical RF signal to explain the operation of the device, the pulses 71 and 73 represent typical pulses of RF energy as received from the main lobe 101 and pulse 72 from the side lobe 102 by the primary antenna; pulses 75, 76 and 77 represent the pulses received by the secondary antenna in time sequence with pulses 71, 72 and 73, pulses 75 and 77 being from the main lobe 101 and pulse 76 from the side lobe 102. FIG. 2 is merely a pictorial representation of the timing sequence of operation of the device and does not show the actual configuration of received or processed pulses as to shape, amplitude, or duration and is simplified to best illustrate only the timing operation. The following assumptions are made to avoid complicating FIG. 2: the pulses resulting from the main lobe are assumed to be approximately three times in amplitude, those of the secondary lobes; the pulses resulting from the secondary antenna are assumed to be approximately two times in amplitude of those in the secondary lobes of the primary antenna; all pulses remain unchanged in amplitude and duration throughout processing, but for the amplitude change in the summation network 53; the inherent delay in all networks is neglected, except that attributed to the delay lines 24, 43 and 52, that delay being one radar pulse width; and both threshold circuits 41 and 54 are set at the same firing level, passing all pulses of a positive sense. Throughout the various time charts of FIG. 2, the vertical axes represents amplitude and the horizontal axes represents time.

Referring to FIG. 1 in conjunction with FIG. 2, RF pulses 71 to 73 in time sequence, shown by chart (a), are received by primary antenna 11 and converted to suitable IF signals in the IF stages, mixer 12, local oscillator 13, and amplifier 14. The IF pulse signal remains in the same time sequence shown in (a). Considering for a moment the path of pulse 71 alone, after amplification in amplifier 14, the monostable switch 31 being normally in position to pass signals from the primary channel, passes the pulse to the logarithmic detector 32 where it is converted to a video pulse, in the case of radar or television, or to an audio pulse in the case of radio. Such pulse is received in the same relative time position as shown by pulse 79 in FIG. 2d. From the detector 32, the pulse is sent to the threshold circuit 41 which as aforementioned is set to such a level that pulses of this amplitude pass through this stage to the multivibrator 42. This pulse 81, FIG. 2e, triggers the multivibrator, generating gate pulse 82 shown in FIG. 2f. This gate pulse passes through delay line 43 where it is delayed for one radar pulse width as represented by pulse 83 in FIG. 2g. Returning now to the other output of detector 32, the pulse 79 of FIG. 2d appears on this lead also and passes to the inverter 51 and delay 52 where it is inverted by 51 and delayed by 52 one pulse width as shown by pulses 84 and 85 in FIGS. 2*i* and 2*h,* respectively. The pulse from the inverter is passed through the summing network or comparator 53 and since no pulse appears on the other input thereto from the delay 52 at that time passes through the network as shown by pulse 86 in FIG. 2*j.* From the summing network 53, the pulse is applied to the threshold circuit 54 which is set to pass pulses only of a positive sense and of predetermined amplitude. Therefore, the inverted pulse 84 does not pass through the circuit 54 and does not appear on FIG. 2*k.*

Returning now to the delayed gating pulse 83 shown in FIG. 2*g,* this pulse is returned to the control input of switch 31 and causes the multivibrator to switch to the normal opened position thereby allowing pulses from the secondary channel (delay 24) to pass. The switch is opened coincidently with the gating pulses of FIG. 2*g.*

FIG. 2*b* represents the time sequence of RF pulse 75 to 77 by the secondary antenna 21. Like pulses 71 to 73, these pulses 75 to 77 are converted to IF signals in a conventional manner in local oscillator 13, mixer 22, and amplifier 23. These pulses, however, are delayed one pulse width by storage line 24 as shown by FIG. 2*c* (pulses 87 to 90). At the instant that pulse 87 appears at switching means 31, the control pulse 83 of FIG. 2*g* triggers the switch 31 and allows the pulse 87 to pass to the detector 32 where it is converted from an IF to a video pulse 91 (see FIG. 2*d*). This pulse passes threshold circuit 41, but does not trigger monostable multivibrator 42 since it is not capable of being refired so quickly after pulse 82. The pulse, however, is processed by the invertor and delay 51 and 52 in the same manner as was pulse 79 shown by pulses 92 and 93 in FIGS. 2*h* and 2*i.*

Thus, the pulses 85 and 93 arrive at the summation network 53 at the same point in time and are algebraicly added therein to produce the pulse 94 shown in FIG. 2*j.* Threshold circuit 54 passes this pulse, FIG. 2*k,* and likewise does, and "AND" circuit 61 since the gating signal 83 opens the gate shown by pulses 96 and 97. Pulse 92 is sent through summing circuit 53 and triggers threshold circuit 54 but is not passed by "AND" circuit 61 since the gating signal 83 has ended by this time; and, therefore, is not seen in the output.

Pulses 72 and 76 which were received in the side lobe of the primary antenna and the secondary antenna respectively are processed in the same manner, except that pulse 99 in FIG. 2*j* is negative and does not pass threshold circuit 54. Thus it does not appear in the output.

All of the components used herein are conventional and well-known by those skilled in the art and may be found in any standard text; for example, *Electronic and Radio Engineering* by Terman, F.E., (McGraw-Hill Book Co., Inc., NY, 1955, 4th Ed.).

Thus, new and improved apparatus for side lobe cancellations in directional receiving systems has been described, the apparatus providing for greater dynamic frequency signal range.

Obviously many modifications and variations of the present invention are possible in the light of the above teachings. It is therefore to be understood that within the scope of the appended claims the invention may be practiced otherwise than as specifically described.

What is claimed is:

1. A side lobe suppression device for use in a directional receiver system comprising
   first means for receiving first RF signals and converting them to first IF signals;
   second means for receiving second RF signals and converting them to second IF signals;
   first delay means connected to the second receiving means for delaying the second IF signals a predetermined time;
   third means operatively connected to said first means and said first delay means for time sharing said first and second IF signals;
   fourth means operatively connected to said third means for demodulating said first and second time-shared IF signals; and
   fifth means operatively connected to said fourth means for comparing one of said first and second demodulated signals with the other, said fifth means including means for inverting the demodulated signals carrying the same information as said delayed IF signals, and a second delaying means for delaying the other demodulated signals a predetermined amount.

2. In the combination of claim 1 further including
   a sixth means operatively connected to said fourth means for generating control pulses to said third means.

3. In the combination of claim 2 said third means including a first monostable multivibrator.

4. In the combination of claim 3 said fourth means including a logarithmic detector.

5. In the combination of claim 4 said sixth means including:
   a first threshold circuit connected to said logarithmic detector;
   a second monostable multivibrator triggered by said first threshold circuit and connected thereto; and
   a third delay means for storing the output signal of said second multivibrator for a predetermined time and operatively connected to said multivibrator.

6. In the combination of claim 5 said fifth means further including:
   a summation network, the input of which is connected to receive the signals from said inverting means and said second delay means; and
   a second threshold circuit connected to receive the output of said summation network.

7. In the combination of claim 5 said first and second means each including:
   an antenna; and
   an IF stage operatively connected thereto.

8. A method of side lobe suppression in a directional receiver system comprising the steps of:
   receiving first RF signals and converting them to first IF signals;
   receiving second RF signals and converting them to second IF signals;
   time-sharing said first and second IF signals;
   demodulating said first and second time-shared IF signals;
   inverting a portion of the demodulated signals;
   delaying another portion of the demodulated signals; and
   combining the inverted and delayed portions of the signals.

* * * * *